United States Patent
Laskowski et al.

(10) Patent No.: US 12,113,229 B2
(45) Date of Patent: Oct. 8, 2024

(54) BATTERY CASING, TRACTION BATTERY AND MOTOR VEHICLE

(71) Applicant: Kautex Textron Gmbh & Co. KG, Bonn (DE)

(72) Inventors: Christine Laskowski, Royal Oak, MI (US); Utsav Panchamia, Troy, MI (US); Georg Enkirch, Salz (DE); Havya Premkumar, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 18/036,223

(22) PCT Filed: Nov. 9, 2021

(86) PCT No.: PCT/EP2021/081145
§ 371 (c)(1),
(2) Date: May 10, 2023

(87) PCT Pub. No.: WO2022/101220
PCT Pub. Date: May 19, 2022

(65) Prior Publication Data
US 2023/0387532 A1    Nov. 30, 2023

(30) Foreign Application Priority Data
Nov. 11, 2020   (DE) .......................... 102020129785.8

(51) Int. Cl.
*H01M 50/244* (2021.01)
*H01M 50/242* (2021.01)
*H01M 50/262* (2021.01)

(52) U.S. Cl.
CPC ....... *H01M 50/244* (2021.01); *H01M 50/242* (2021.01); *H01M 50/262* (2021.01); *H01M 2220/20* (2013.01)

(58) Field of Classification Search
CPC ............ H01M 50/244; H01M 50/242; H01M 50/262; H01M 2220/20
See application file for complete search history.

(56) References Cited

U.S. PATENT DOCUMENTS

| 2011/0143179 A1* | 6/2011 | Nakamori | ........... H01M 50/271 |
| | | | 429/99 |
| 2012/0103714 A1* | 5/2012 | Choi | ........................ B60K 1/04 |
| | | | 180/68.5 |

(Continued)

FOREIGN PATENT DOCUMENTS

| DE | 102018120371 | * | 2/2020 | ............. H01M 2/10 |
| DE | 102018120371 A1 | | 2/2020 | |

(Continued)

OTHER PUBLICATIONS

Machine English translation of DE 102018120371 (Year: 2020).*

(Continued)

*Primary Examiner* — Michael L Dignan
(74) *Attorney, Agent, or Firm* — Occhiuti & Rohlicek LLP (57) ABSTRACT

A battery casing for accommodating at least one battery component in a battery casing volume, said battery casing having at least one plastic battery casing shell, which at least partly defines the battery casing volume, and at least one fastening device for attaching the battery component to the battery housing shell, the battery casing being characterized in that the battery casing shell includes at least one reinforcing structure which extends into the battery casing volume, and the fastening device is supported on the reinforcing structure. The present invention further discloses a traction battery for a motor vehicle and a motor vehicle having a traction battery.

15 Claims, 5 Drawing Sheets

(56) References Cited

U.S. PATENT DOCUMENTS

| | | | |
|---|---|---|---|
| 2015/0222131 A1 | 8/2015 | Kano | |
| 2018/0269443 A1* | 9/2018 | Takahashi | H01M 50/262 |
| 2018/0337374 A1* | 11/2018 | Matecki | B60K 1/04 |
| 2020/0185672 A1* | 6/2020 | Seo | H01M 10/6568 |
| 2021/0066679 A1* | 3/2021 | Chen | H01M 50/262 |
| 2021/0273285 A1* | 9/2021 | Bluemel | H01M 50/209 |
| 2021/0399267 A1* | 12/2021 | Wolf | H01M 50/20 |

FOREIGN PATENT DOCUMENTS

| | | | | |
|---|---|---|---|---|
| EP | 2528134 A1 | 11/2012 | | |
| EP | 2741343 | * 6/2014 | | H01M 2/02 |
| EP | 2741343 A1 | 6/2014 | | |
| JP | 2011146340 A | 7/2011 | | |
| JP | 201373845 A | 4/2013 | | |
| JP | 201837267 A | 3/2018 | | |
| JP | 201991633 A | 6/2019 | | |
| WO | 2018213383 A1 | 11/2018 | | |
| WO | 2020038972 A1 | 2/2020 | | |

OTHER PUBLICATIONS

International Preliminary Report on Patentability, in PCT/EP2021/081145, mailed Jul. 27, 2022 (7 pages).
International Search Report, PCT Application No. PCT/EP2021/081145, mailed Feb. 10, 2022 (3 pages).

\* cited by examiner

BATTERY CASING, TRACTION BATTERY AND MOTOR VEHICLE

This patent application is a 371 national stage of International Application No. PCT/EP2021/081145, filed Nov. 9, 2021, which claims the benefit of the filing date of German patent application 10 2020 129 785.8, filed Nov. 11, 2020, the contents of which are hereby incorporated by reference in their entireties.

The present invention relates to a battery casing of a traction battery, a traction battery, and a motor vehicle.

A battery, and in particular a traction battery for storing energy in a motor vehicle, consists of a multiplicity of components. A battery casing of the traction battery thereby has the task of fastening and protecting battery components in the form of battery modules and/or cooling modules and the like.

Securely fixing battery components to the battery casing under all operating conditions and over the service life of the battery is of great importance for absorbing and dissipating inertial forces that occur.

The object of the invention is that of providing an improvement over or an alternative to the prior art.

The object of the present invention is achieved by a battery housing having the features of claim 1. Advantageous embodiments of the battery shells are described in the claims dependent upon claim 1.

More precisely, the object forming the basis of the present invention is achieved by a battery casing for accommodating at least one battery component in a battery casing volume, wherein the battery casing is provided for a traction battery of a motor vehicle. The battery casing has at least one battery casing shell made of plastic and at least partially defining the battery casing volume, and at least one fastening device for attaching the battery component to the battery casing shell. The battery casing is characterized in that the battery casing shell has at least one reinforcing structure which is connected to a floor and/or a wall of the battery casing shell, wherein the fastening device is supported on the reinforcing structure.

The reinforcing structure preferably extends into the battery casing volume and/or defines the battery casing volume.

The battery housing according to the invention has a plurality of advantages. An advantage of the battery casing according to the invention is that an introduction of force or of a load of the battery component to the battery casing shell takes place in a region in which the battery casing shell has increased stability or rigidity. A corresponding introduction of force or load takes place upon any type of acceleration of a motor vehicle in which the battery casing is installed—for example, upon acceleration, upon braking, during cornering, or in particular in the event of an accident of the motor vehicle.

A further advantage of the battery casing designed according to the invention is that this has an improved installation space efficiency, since a minimum structural height of the battery casing remains below the battery component to be fastened.

A further advantage of the battery casing according to the invention is that this has increased safety in the event of an external fire. This is because the fastening device is protected from a direct exposure to fire by a floor structure or the battery floor.

A further advantage of the battery casing according to the invention is that a sagging of the floor surface of the battery casing is reduced due to a reduced introduction of load and introduction of force into the battery floors of the battery casing. Moreover, a corresponding sagging of the floor surface or of the bottom wall of the battery casing has no influence, or at least a reduced influence, on the positioning of the battery components within the battery casing. An increased positioning accuracy and positioning stability of the battery components to be fastened is thus ensured.

Yet another advantage of the battery casing according to the invention is that the battery component is decoupled from the battery casing floor, so that possible loads on the battery casing floor, e.g., due to road stones or other external effects, do not act directly on the battery component, but instead only indirectly via the reinforcing structure. This leads to improved protection of the battery components, and thus to an improved longevity of a traction battery which has the battery casing according to the invention.

Yet another advantage of the battery casing according to the invention is that a traction battery having the battery casing according to the invention has a considerably reduced assembly cost, since the fastening of the battery component or battery components takes place by means of the fastening device or fastening devices, so that individual fastening elements (for example, threaded sleeves embedded in the battery casing) are no longer necessary, so that a cycle time for producing the traction battery is reduced for producing a traction battery which has the battery casing according to the invention.

Moreover, the battery casing according to the invention has the advantage that the number of insert parts which are to be inserted into a device for producing a battery casing is reduced in the case of an injection-molded battery casing or in the case of a battery casing produced by means of extrusion, whereby the cycle time for producing the battery casing is reduced, and the handling of the battery casing in a simplified manner is enabled.

Furthermore, the battery casing according to the invention has the advantage that the tolerances that must be complied with for fastening and retaining battery components are largely concentrated in a reduced number of components (viz., the fastening device or fastening devices), because the respective battery components are in each instance connected to the battery casing shell by means of the fastening device or fastening devices.

The tolerances to be complied with in the assembly of a traction battery are concentrated on only a few components in the form of the fastening device or fastening devices, so that the tolerance chains are shortened and therefore easier to comply with. Furthermore, possible changes in the shape of the battery casing which, for example, are induced by temperature fluctuations and/or fluctuations in the moisture content of the environment have a reduced influence on the positioning of the battery components.

The fastening device is a component separate from the battery casing shell. Consequently, the battery component is indirectly connected to the battery casing shell by means of the fastening device.

The battery casing shell preferably has polyamide as the plastic, and further preferably consists of polyamide. Further preferably, the plastic is fiber-reinforced—for example, by means of glass fibers and/or by means of carbon fibers.

The battery casing volume can also be referred to as a battery casing accommodation space.

The fastening device preferably has metal or is formed from metal. Suitable metals are iron, steel, aluminum, copper, brass, or alloys of the aforementioned metals. In the case of a corresponding design of the battery casing, due to the electrical conductivity, the fastening device can be used as a grounding path and/or generally as a potential equalization in the battery casing.

Further preferably, the fastening device is formed from a plastic, and further preferably from a fiber-reinforced plastic. A fastening element or fastening elements can here be enclosed by the plastic material. For example, a threaded sleeve or a plurality of threaded sleeves can be embedded in the plastic material.

The battery component to be fastened is, for example, a battery module, a cooling module, a fluid line, or the like. According to the invention, there are no restrictions in this regard.

The reinforcing structure is preferably formed as one piece, and even more preferably monolithically with the battery casing shell. A monolithic embodiment of the reinforcing structure is understood to mean a reinforcing structure which is formed together with the battery casing shell in one production step.

The wall of the battery casing shell can also be referred to as a front wall or as a side wall. The reinforcing structure preferably extends into the battery casing volume. More preferably, the reinforcing structure is formed as a projection in the floor and/or in the wall of the battery casing shell.

The battery casing preferably has a cover closing the battery casing shell, or a further, second battery casing shell which closes the first battery casing shell.

The battery casing is preferably designed such that the fastening device has at least one fastening element, and preferably a plurality of fastening elements, for fastening the at least one battery component to the fastening device.

The correspondingly designed battery casing has the advantage that a battery component or a plurality of battery components can be fastened in a further simplified manner in the battery casing.

The fastening element or fastening elements is/are preferably designed in each instance as a threaded bushing or as a threaded pin, or as a latching projection or as a latching hook.

In the case of a fastening device made of metal, the respective fastening elements are preferably formed as one piece with the fastening device. In the case of a fastening device formed from plastic, the plastic material of the fastening device preferably flows around the respective fastening elements, and in particular when the respective fastening elements are formed from a metal.

The battery casing is preferably designed such that the fastening device is connected in a form-fitting manner to the battery casing shell.

The correspondingly designed battery casing has a further reduced assembly cost.

The fastening device is preferably screwed to the battery casing shell. For this purpose, the fastening device can, for example, be connected by means of a plurality of screws to the battery casing shell, and preferably to the reinforcing structure of the battery casing shell.

Further preferably, the fastening device is connected to the battery casing shell by means of a latching connection. The fastening device can here have a latching projection or a plurality of latching projections which, in each instance, engage in a number of latching openings—corresponding to the number of latching projections—of the battery casing or of the reinforcing structure. Furthermore, the battery shell or the reinforcing structure can have a latching projection or a plurality of latching projections which, in each instance, engage in a number of latching openings—corresponding to the number of latching projections—of the fastening device.

The battery casing is preferably designed such that the fastening device is designed as a fastening rail.

The correspondingly designed battery casing has the advantage that the fastening device can, in a simplified manner, have a plurality of fastening elements, so that a battery component and in particular a plurality of battery components can be connected to the battery casing shell in a simplified manner by means of the fastening device. Therefore, a correspondingly designed battery casing enables a further reduced assembly cost of a traction battery which has the correspondingly designed battery casing.

Further preferably, the battery casing is designed such that at least the fastening rail has at least one fastening strip in which is arranged at least one fastening element.

In the case of the correspondingly designed battery casing, the assembly cost for a traction battery which has the correspondingly designed battery casing is again reduced.

Further preferably, the battery casing is designed such that the fastening device has an accommodation recess, and in particular an accommodation groove, in which the reinforcing structure is accommodated.

The correspondingly designed battery casing has the advantage that the positioning of the fastening device with respect to the battery casing shell is enabled in a simplified manner with increased accuracy. Consequently, the positioning of a battery component or of a plurality of battery components in the battery casing is also enabled with increased accuracy.

The battery casing is preferably designed such that the at least one reinforcing structure is designed as a central web which extends along a longitudinal extent of the battery casing shell.

The correspondingly designed battery casing combines several advantages with one another, since the battery casing shell—and thus also the battery casing—have an improved stability, and the battery component or battery components is/are supported substantially centrally by the fastening device, so that a sagging of the battery component or battery components is counteracted.

Further preferably, the central web has at least one connecting device by means of which the fastening device is connected to the central web. The connecting device is preferably designed as a threaded bore or as a threaded sleeve, so that the fastening device can be screwed to the central web.

The battery casing is preferably designed such that the at least one reinforcing structure is designed as a double web which extends along a longitudinal extent of the battery casing shell.

The correspondingly designed battery housing has a further increased stability and rigidity.

The double web has two webs, i.e., a first and a second web, which run parallel to one another along the longitudinal extent of the battery casing shell. The double web is preferably formed centrally in the battery casing shell.

Further preferably, the battery casing is designed such that at least one connecting device is formed between two webs of the double web, by means of which connecting device the fastening device is connected to the double web.

The connecting device is preferably designed as a threaded bore or as a threaded sleeve, so that the fastening device can be screwed to the central web.

The battery casing is preferably designed such that the at least one reinforcing structure is designed as an edge web which extends along a longitudinal extent and/or along a transverse extent of the battery casing shell and is adjacent to a side wall of the battery casing shell.

The correspondingly designed battery casing has a further improved stability and rigidity—in particular, in the region of its side walls. The correspondingly designed battery casing also enables a further simplified assembly of a battery module or of a plurality of battery modules in the battery casing.

The battery casing is preferably designed such that the at least one reinforcing structure is designed as a projection or wall projection of the wall or of the side wall.

The corresponding battery casing is particularly easy to produce, and therefore has low production costs. The wall projection can also be referred to as a bend of the wall.

The battery casing preferably has at least one hold-down device, wherein the hold-down device is connected to the battery casing shell, and wherein the fastening device is arranged between the at least one hold-down device and the battery casing shell and is charged with force in the direction of the reinforcing structure by means of the hold-down device.

The correspondingly designed battery casing has the advantage that the installed battery component is reliably charged with force in the direction of the casing floor. If two battery components are installed in the form of a battery module and a cooling module which are installed one above the other in the battery casing and in contact with one another, the correspondingly designed battery casing offers the advantage that an improved contact between the battery module and the cooling module is achieved by means of the hold-down device. An improved cooling of the battery modules is thereby achieved.

The hold-down device is preferably designed as a cross-member. In the case of a corresponding design of the battery casing, its stability and rigidity are improved in particular in the case of a loading in the transverse direction.

The object forming the basis of the present invention is also achieved by a traction battery having the features of claim 12. Advantageous embodiments of the traction battery are described in the claims dependent upon claim 12.

More precisely, the object upon which the present invention is based is achieved by a traction battery for a motor vehicle, wherein the traction battery has a battery casing described further above of the present description, and at least one battery component which is connected to the battery casing shell by means of the fastening device.

The traction battery preferably has at least two battery components in the form of at least one battery module and at least one cooling module, wherein the cooling module is arranged between the fastening device and the battery module.

The correspondingly designed traction battery has the advantage that an improved thermal coupling of the battery module to the cooling module is achieved.

Particularly in the case of a design of the battery casing with a hold-down device, which can preferably be designed as a crossmember as described above, a further improved thermal coupling of the battery module to the cooling module is achieved, since an improved contact between the battery module and the cooling module is achieved by means of the hold-down device.

The object forming the basis of the present invention is also achieved by a motor vehicle having the features of claim 15.

Further advantages, details, and features of the invention can be found below in the described embodiments. In the drawings, in detail.

In the following description, the same reference signs denote the same components or features, such that a description of a component with reference to one drawing also applies to the other drawings. This avoids repeating the description. Furthermore, individual features that have been described in connection with one embodiment can also be used separately in other embodiments.

Figure 1A:
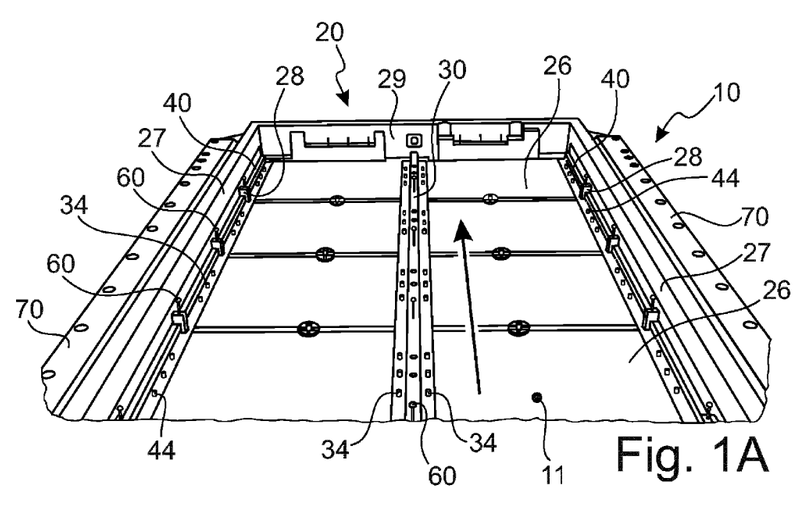
FIG. 1A: shows a perspectival depiction of an inner region of a battery casing shell of a battery casing according to the invention.
Figure 1B:
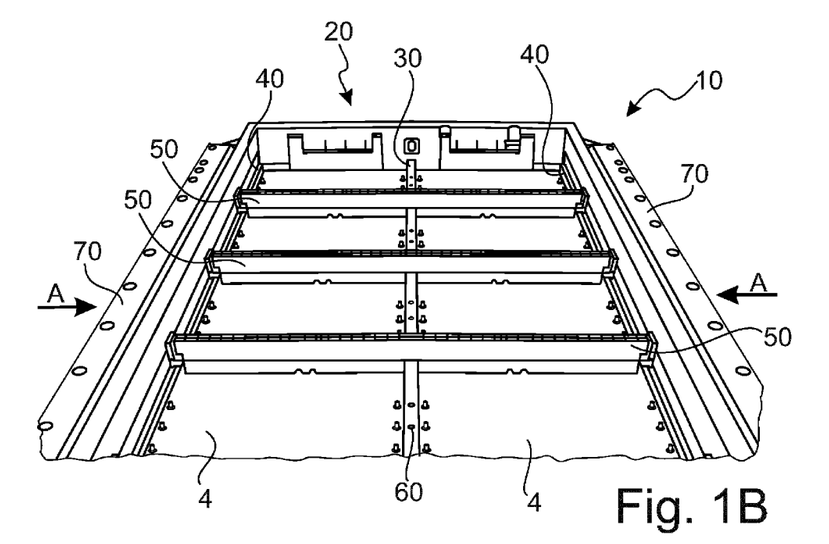
FIG. 1B: shows the battery casing shell depicted in FIG. 1A, with installed battery components in the form of cooling modules.

FIG. 1A shows a perspectival depiction of an inner region of a battery casing shell 20 of a battery casing 10 according to the invention, so that a battery casing volume 11 or an accommodation volume 11 is visible. FIG. 1B shows the battery casing shell 20 depicted in FIG. 1A, with installed battery components 4 in the form of cooling modules 4.

From FIGS. 1A and 1B, it is clear that the battery casing shell 20 at least partially defines the battery casing volume 11. For this purpose, the battery casing shell 20 has a floor 26 which is enclosed by two side walls 27, running parallel to a longitudinal extent L of the battery casing shell 20, and by two end walls 29. The battery casing shell 20 is formed from a plastic, and further preferably from a fiber-reinforced plastic. A duroplastic plastic or a thermoplastic plastic is suggested as a plastic; in particular, polyamide is suggested as a suitable plastic.

It is further apparent from FIGS. 1A and 1B that the battery casing 10 has impact protection devices 70 attached to two outer sides of the side walls 27, which impact protection devices 70 are designed to protect the battery casing 10 in the event of an accident.

In the exemplary embodiment of the battery casing 10 depicted in FIGS. 1A and 1B, said battery casing 10 has three fastening devices 30, 40 for fastening at least one battery component 2, 4 to the battery casing shell 20. A fastening device 30 is designed as a centrally-arranged fastening device 30 which runs along a central axis and parallel to the longitudinal extent L of the battery casing 20.

The exact structure of the fastening device 30 is explained further below with reference to FIGS. 2A, 2B, and 4B. The battery casing 20 also has two further fastening devices 40 which likewise run parallel to the longitudinal extent L of the battery casing shell 20, wherein the two further fastening device 40 run in the direct vicinity of the side walls 27 of the battery casing shell 20. The precise design of the fastening devices 40 is explained further below with reference to FIGS. 3A, 3B, 4A, and 5. The respective fastening devices 30, 40 are connected to the battery casing shell 20 by means of screws 60.

Figure 2A:
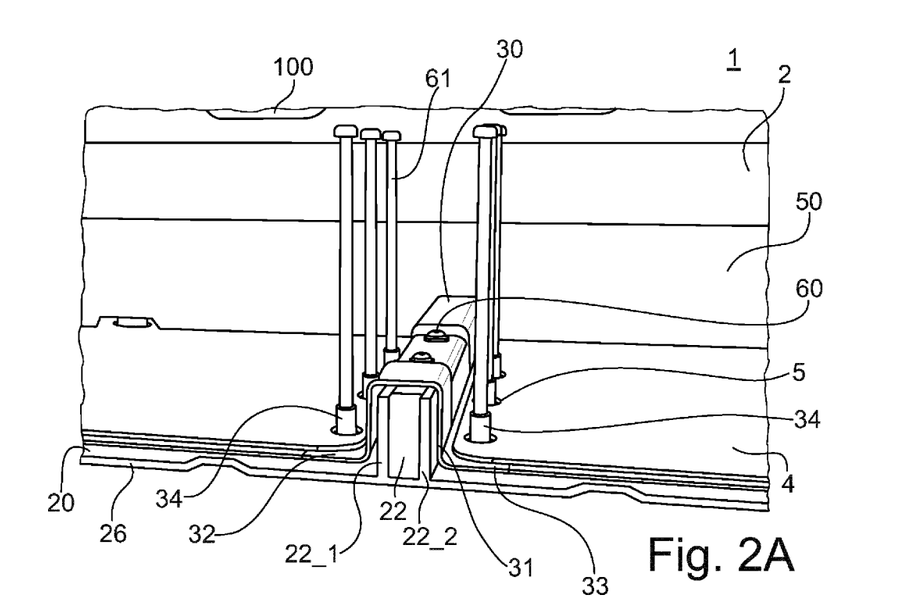
FIG. 2A: shows a cross-sectional depiction of a traction battery which has the battery casing shell depicted in FIG. 1B, wherein the section through the battery casing shell has taken place along the plane A-A of FIG. 1B, and the battery casing shell is depicted in the region of a central web.
Figure 2B:
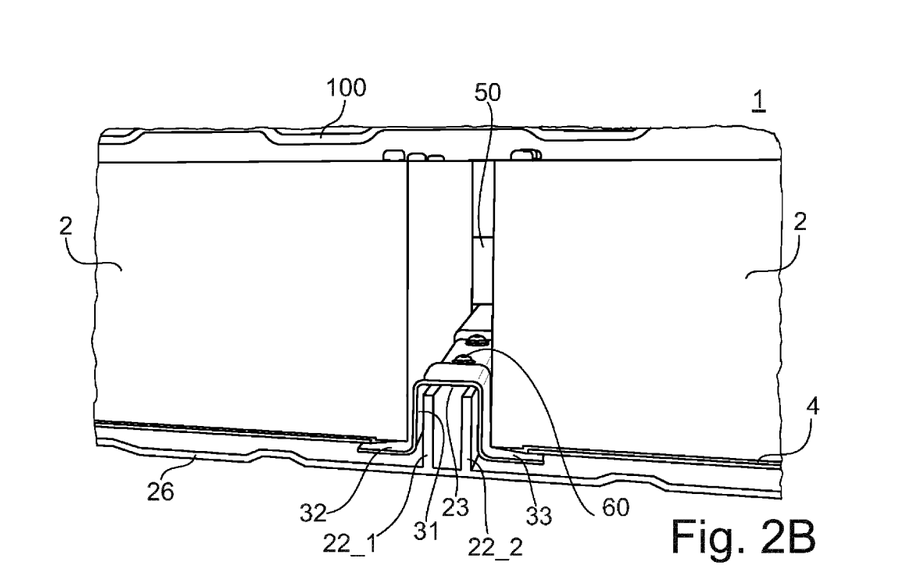
FIG. 2B: shows the traction battery depicted in FIG. 2A, with further installed battery components in the form of battery modules.

From FIGS. 2A and 2B, it is clear that the battery casing shell 20 has a reinforcing structure 22 extending into the battery casing volume 11. The fastening device 30 is thereby supported on the reinforcing structure 22. Consequently, the fastening device 30 is at least indirectly, and more preferably directly, in contact with the reinforcing structure 22.

The reinforcing structure 22 is designed as a central web 22 which extends along the longitudinal extent L of the battery casing shell 20. The central web 22 thereby has a first web 22_1 and a second web 22_2, and can thus also be referred to as a double web 22. A plurality of connecting devices 23, by means of which the fastening device 30 can be connected to the central web 22, are formed within the central web 22. In the present embodiment, the connecting devices 23 are thereby designed as threaded sleeves. The threaded sleeves 23 can be formed in the central web 22 integrally with said central web 22. It is furthermore possible that the connecting devices 23 be also designed as separate connecting devices 23 which are surrounded by the plastic material of the central web 22. The fastening rail 30 is then connected to the central web 22 by means of screws 60, in that the screws 60 engage in the threaded sleeves 23. Alternatively and/or additionally, it is also possible that the screws 60 be screwed directly into the central web 22, wherein the screws 60 penetrate into the material of the central web 22 due to their external thread and produce a thread in the material of the central web 22 by screwing in.

Alternatively and/or additionally, it would also be possible that the connection between the fastening rail 30 and the central web 22 be achieved by means of a rivet connection and/or by means of a latching connection.

The fastening device 30 is designed as a fastening rail 30 and has a relief channel 31, in the form of an accommodation groove 31, in which the reinforcing structure 22 is accommodated. The fastening rail also has two fastening strips 32, 33, which are each designed as a projection of the fastening rail 30. In the two fastening strips 32, 33, a plurality of fastening elements 34 are respectively arranged, into which screws 61 can be screwed so that battery components 2, 4 to be fastened are reliably held within the battery casing volume 11.

From FIG. 2A, it can be seen that the depicted cooling modules 4 in each instance have a plurality of fastening openings 5. The respective fastening elements 34 project through the fastening openings 5, so that the respective cooling modules 4 are connected to the fastening rail 30.

It can be seen from FIG. 2B that a respective battery module 2 rests on the respective cooling modules 4. The respective battery modules 2 likewise have fastening openings 3 (see FIG. 4B) through which the screws 61 project, so that the battery modules 2 are also reliably connected to the fastening rail 30. By means of the screws 61, the battery modules 2 can be charged with force in the direction of the cooling modules 4 so that an intimate connection between the battery modules 2 and the cooling modules 4 is ensured, whereby a reliable thermal coupling is ensured between battery modules 2 and cooling modules 4 that are respectively in contact.

Figure 3A:
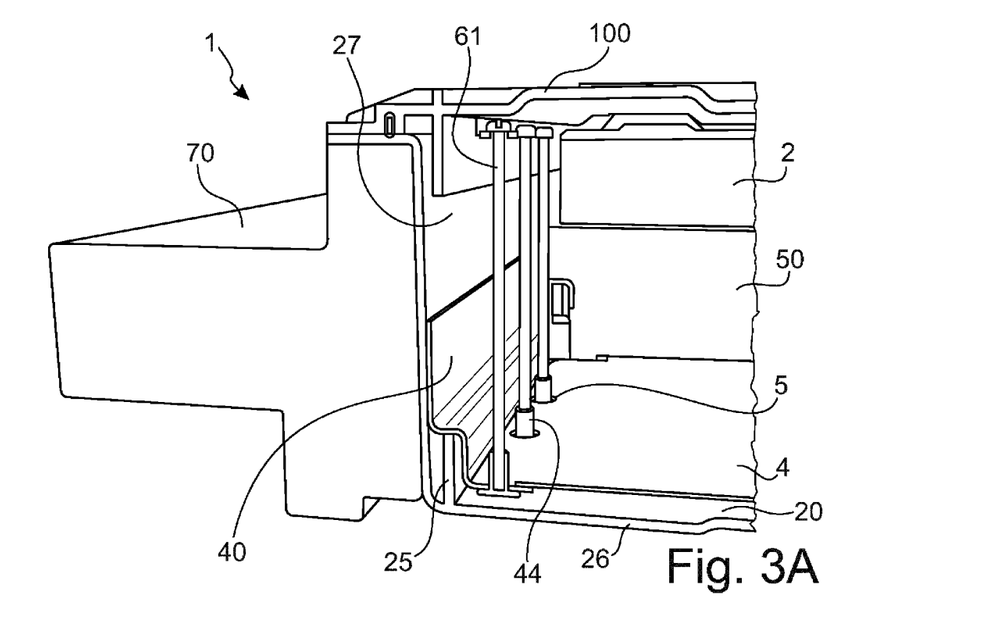
FIG. 3A: shows a cross-sectional depiction of a traction battery which has the battery casing shell depicted in FIG. 1B, wherein the section through the battery casing shell has taken place along the plane A-A of FIG. 1B, and the battery casing shell is depicted in the region of an edge web.
Figure 3B:
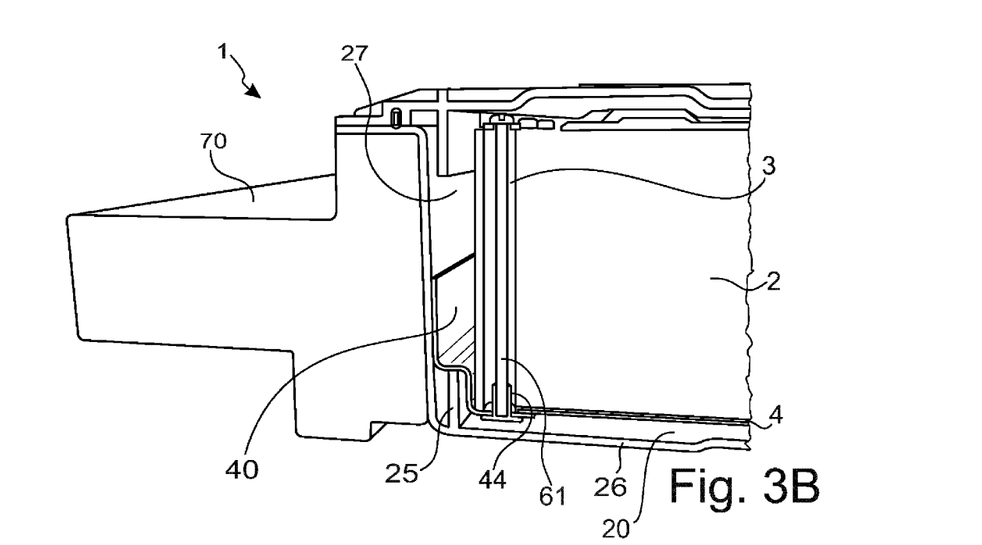
FIG. 3B: shows the traction battery depicted in FIG. 3A, with further installed battery components in the form of battery modules.

The traction battery 1 is depicted in cross-section, in the region of a side wall 27, in FIGS. 3A and 3B. It can be seen that the battery casing shell 20 has, in the region of its side wall 27, a reinforcing structure 25 in the form of an edge web 25 which extends along the longitudinal extent L of the battery casing shell 20 and is arranged adjacent to the side wall 27. The fastening device 40 is designed as a fastening rail 40 and is supported on the edge web 25.

The fastening rail 40 also has a plurality of fastening elements 44 which are designed as threaded sleeves 44. The fastening devices 44 are thereby arranged in a fastening strip 42 of the fastening device 40. Screws 61 can be screwed into the fastening elements 44, which screws 61 project through both fastening openings 5 of the cooling modules 4 and fastening openings 3 of the battery modules 2, so that the respective battery modules 2 can be charged with force by means of the screws 61 in the direction of the respective cooling modules 4.

Figure 4A:
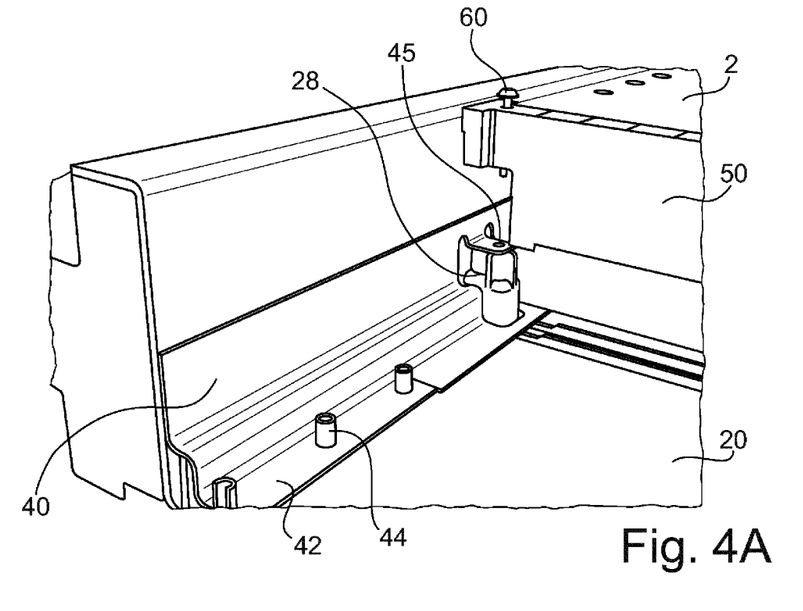
FIG. 4A: shows a further cross-sectional depiction of the traction battery depicted in FIG. 3A.
Figure 4B:
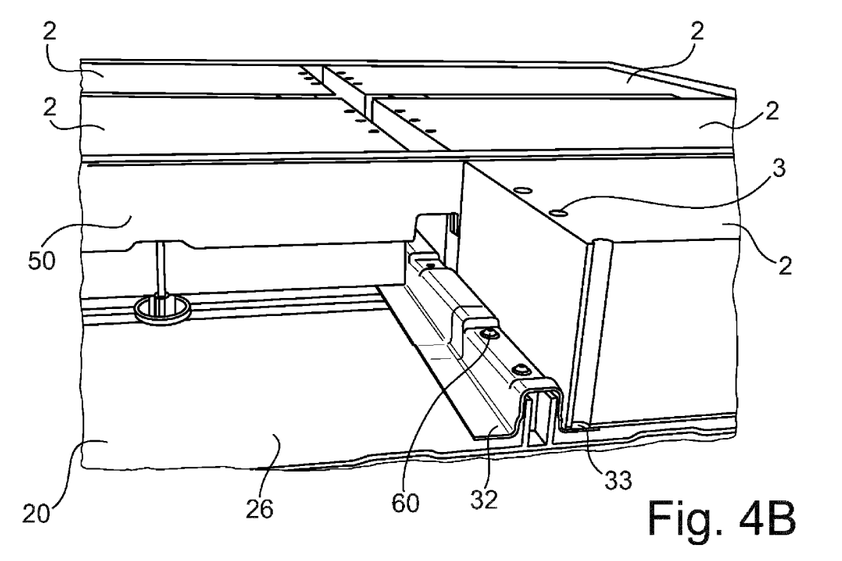
FIG. 4B: shows a further cross-sectional depiction of the traction battery depicted in FIG. 2B, with an omitted battery module.

It can be seen—in particular, from FIG. 4A—that the battery casing 10 has a plurality of hold-down devices 50 in the form of crossmembers 50. The respective crossmembers 50 are connected to the battery casing shell 20 in that a screw 60 projects through the respective crossmembers 50 and a through-opening 45 in a tab of the fastening rail 40, and is screwed into a fastening dome 28 of the battery casing shell 20. The respective crossmembers 50 are thus connected to the battery casing shell 20. The fastening rail 40 is consequently arranged between a crossmember 50 and the battery casing shell 20, and is charged with force by means of the crossmembers 50 in the direction of the reinforcing structure 25.

Figure 5:
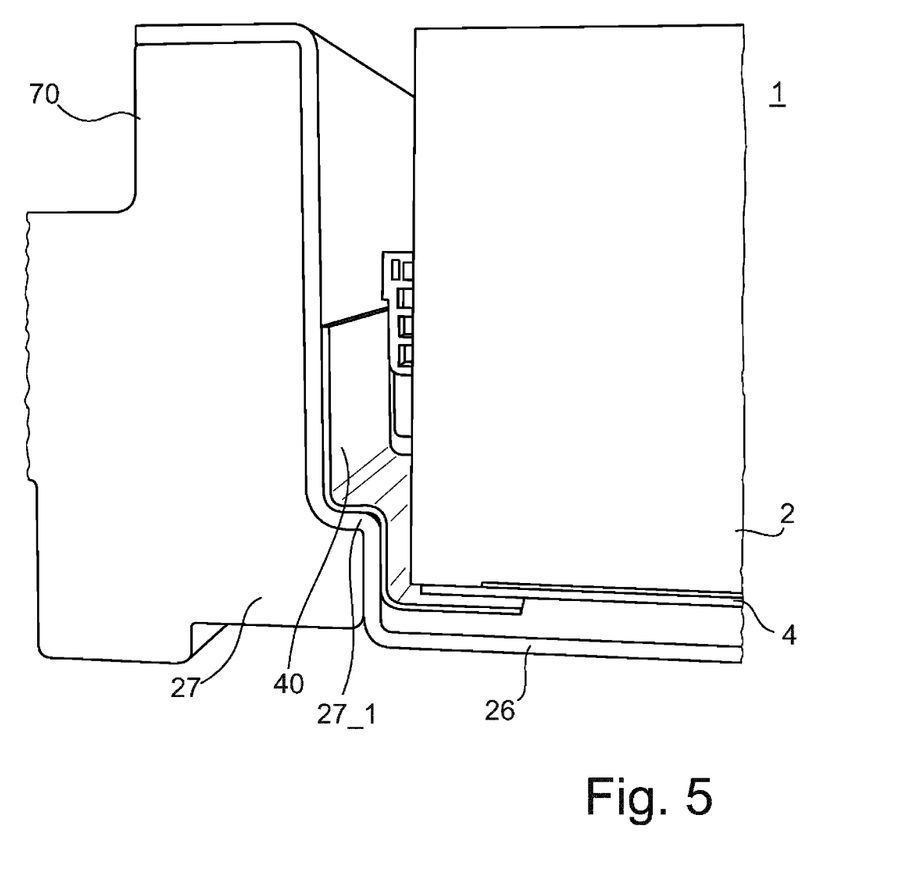
FIG. 5: shows a cross-sectional representation of a traction battery which has a battery casing according to a further embodiment of the present invention, wherein the traction battery is depicted in a region of a side wall of a battery casing shell.

A traction battery 1 according to a further embodiment of the present invention is depicted in cross-section, in the region of its side wall 27, in FIG. 5. It can be seen that the wall 27 in the form of the side wall 27 has a reinforcing structure 27_1 in the form of a wall projection 27_1. The wall projection 27_1 extends along the longitudinal extent L of the battery casing shell 20. The fastening device 40 is designed as a fastening rail 40 and is supported on the wall projection 27_1.

The rest of the design of the traction battery 1 depicted in FIG. 5 corresponds to the design of the traction battery 1 depicted in FIG. 3B, so that, to avoid repetition, reference is made to the corresponding description.

LIST OF REFERENCE SIGNS

1 Traction battery
2 Battery component, battery module
3 Fastening opening (of the battery module)
4 Battery component, cooling module
5 Fastening opening (of the cooling module)
10 Battery housing
11 Battery casing volume
20 Battery casing shell
21 Side wall (of the battery casing shell)
22 Central web, double web, reinforcing structure
22_1 First web (of the double web)
22_2 Second web (of the double web)
23 Connecting device (of the reinforcing structure)
25 Edge web, reinforcing structure
26 Floor (of the battery casing shell)
27 Wall/side wall (of the battery casing shell)
27_1 Wall projection, reinforcing structure 28 Fastening dome
29 Wall/end wall (of the battery casing shell)
30 Fastening device/fastening rail
31 Accommodation recess/accommodation groove (of the fastening device)
32 (First) fastening strip (of the fastening device)
33 (Second) fastening strip (of the fastening device)
34 Fastening element/threaded sleeve
40 Fastening device/fastening rail
42 Fastening strip (of the fastening device)
44 Fastening element/threaded sleeve
45 Through-opening (of the fastening device)
50 Hold-down device/crossmember
60 Screw
61 Screw
70 Impact protection device
100 Cover (of the battery casing)
L Longitudinal extent (of the battery casing shell)

The invention claimed is:

1. Battery casing for accommodating at least one battery component in a battery casing volume, wherein the battery casing has
at least one battery casing shell made of plastic and at least partially defining the battery casing volume, and
at least one fastening device for fastening the battery component to the battery casing shell,
wherein the battery casing is characterized by the following features:
the battery casing shell has at least one reinforcing structure that is connected to a floor of the battery casing shell;
the fastening device is supported on the reinforcing structure;
the fastening device has at least one fastening element for fastening the at least one battery component to the fastening device, wherein the fastening device has an accommodation recess in which the at least one reinforcing structure is accommodated; and
wherein the at least one reinforcing structure is designed as a double web which extends along a longitudinal extent (L) of the battery casing shell, the reinforcing structure formed as a projection in the floor of the battery casing shell.

2. Battery casing according to claim 1, wherein the fastening device is connected to the battery casing shell in a form-fitting manner.

3. Battery casing according to claim 1, wherein the fastening device is a fastening rail.

4. Battery casing according to claim 3, wherein the fastening rail has at least one fastening strip in which is arranged at least one fastening element.

5. Battery casing according to claim 1, wherein the accommodation recess is an accommodation groove.

6. Battery casing according to claim 1, wherein the at least one reinforcing structure is designed as a central web which extends along a longitudinal extent (L) of the battery casing shell.

7. Battery casing according claim 1, wherein the at least one reinforcing structure is designed as a double web which extends along a longitudinal extent (L) of the battery casing shell.

8. Battery casing according to claim 7, wherein at least one connecting device is formed between two webs of the double web, by means of which connecting device the fastening device is connected to the double web.

9. Battery casing according to claim 1, wherein the at least one reinforcing structure is designed as an edge web which extends along a longitudinal extent (L) and/or along a transverse extent of the battery casing shell and is adjacent to a side wall of the battery casing shell.

10. Battery casing according claim 1, wherein the at least one reinforcing structure is designed as a wall projection of the wall.

11. Battery casing according to claim 1, characterized by the following features:
the battery casing has at least one hold-down device;
the hold-down device is connected to the battery casing shell; and
the fastening device is arranged between the at least one hold-down device and the battery casing shell, and is charged with force in the direction of the reinforcing structure by means of the hold-down device.

12. Traction battery for a motor vehicle, wherein the traction battery has a battery casing according to claim 1 and at least one battery component which is connected to the battery casing shell by means of the fastening device.

13. Traction battery according to claim 12, characterized by the following features:
the traction battery has at least two battery components in the form of at least one battery module and at least one cooling module; and
the cooling module is arranged between the fastening device and the battery module.

14. Motor vehicle having a traction battery according to claim 12.

15. Battery casing according to claim 1, wherein the fastening device has a plurality of fastening elements.

* * * * *